J. D. MALLOY.
PIN CALIPER.
APPLICATION FILED JUNE 17, 1920.
1,379,116.
Patented May 24, 1921.
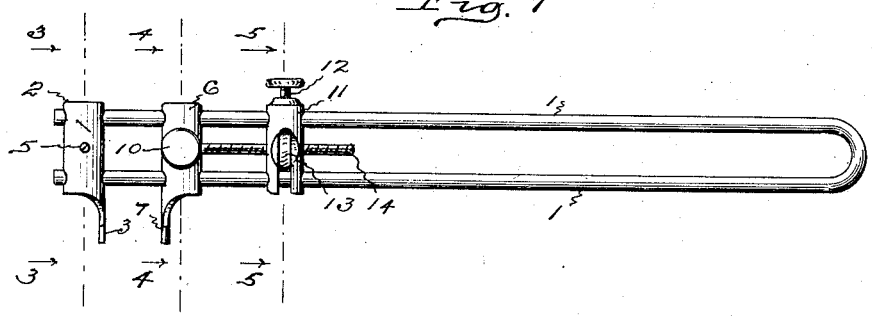
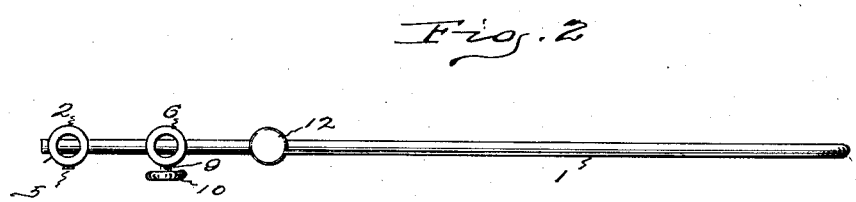
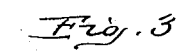
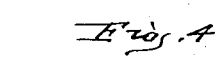
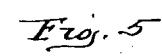
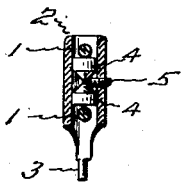
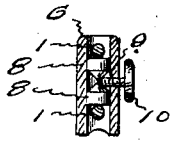
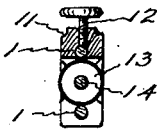
Inventor:
John D. Malloy by
Harry R. Williams
Atty.

UNITED STATES PATENT OFFICE.

JOHN D. MALLOY, OF HARTFORD, CONNECTICUT.

PIN-CALIPER.

1,379,116.     Specification of Letters Patent.     Patented May 24, 1921.

Application filed June 17, 1920. Serial No. 389,571.

*To all whom it may concern:*

Be it known that I, JOHN D. MALLOY, a citizen of the United States, residing at Hartford, in the county of Hartford and State of Connecticut, have invented a new and useful Improvement in Pin-Calipers, of which the following is a specification.

This invention relates to those instruments of precision known as pin calipers which are designed for calipering the diameters of and distances apart of small, round holes, slots, and similar openings in metal, which openings are of such size and shape or are so located that they cannot be engaged for accurate measurement by the common forms of vernier and micrometer calipers, the dimensions obtained by the pin caliper being subsequently measured by vernier or micrometer caliper.

The object of this invention is to provide an instrument of this nature composed of parts which are very cheap to manufacture, easy to assemble, convenient to manipulate, and accurate and durable in use.

This object is attained by so designing the instrument that all of the parts can be made from readily obtainable simple stock supplies requiring but a minimum number of machine operations to fit them for assembly and use.

In the accompanying drawings Figure 1 shows a side view of a caliper which embodies the invention. Fig. 2 shows a top edge view. Fig. 3 shows a transverse section on the plane indicated by the dotted line 3—3 on Fig. 1. Fig. 4 shows a section on the plane indicated by the dotted line 4—4 on Fig. 1. Fig. 5 shows a section on the plane indicated by the dotted line 5—5 on Fig. 1.

The beam 1 of the caliper is formed from a round, steel rod or wire bent to U shape. The head 2 is cut from a steel tube and drilled transversely with two holes that will fit the wire legs of the beam closely yet allow the head to be slid back and forth if desired. One end of the head is milled or ground away so as to provide a small, round calipering pin 3. Inside of the head between the wires is a pair of plugs 4 desirably cut from round steel rod. The adjacent ends of these plugs are conical, and threaded through the side of the head against the conical ends of the plugs is a screw 5. By turning the screw in, the plugs are wedged out against the wires. This holds the head in position and firmly ties the ends of the wires together. As this head is ordinarily the fixed jaw of the caliper, and is seldom moved the screw 5 may be headless, as shown. Of course by turning out this screw the plugs are loosened and then the head can be slid along the beam as may sometimes be necessary in order to get access to the cavity to be calipered.

The head 6 is practically a duplicate of the head 2. It is cut from a steel tube, has its end milled or ground away to provide a calipering pin 7, and is drilled transversely so as to fit the wire legs of the beam. In this head between the wires is a pair of plugs 8 with conical adjacent ends, and threaded through the side of the head against the conical ends of the plugs is a screw 9. As this head forms the movable jaw of the caliper the screw 9 desirably has a knurled thumb piece 10 so that it may be easily turned in for forcing the plugs out against the wires or turned out for loosening the plugs so that the head may be moved along the wires.

The adjusting member 11 is formed from a round piece of steel with two transversely drilled holes for the beam wires. In one end is a thumb screw 12 which when turned in will clamp against the top wire and hold the adjusting member from movement along the wires. The adjusting member has a slot milled lengthwise and in this slot, between the wires is a thumb nut 13. A feed screw 14 fastened to the movable head extends through the adjusting member and the nut.

The movable head and adjusting member are drawn along the beam wires to approximate position and the adjusting member clamped. The calipering pins are inserted into the cavity to be measured and by means of the thumb nut and adjusting screw the heads are separated until the outer surfaces of the pins engage with the side walls of the cavity. After the movable head is clamped in the position to which it has been adjusted the distance apart of the outer surfaces of the pins may be accurately measured by vernier or micrometer calipers and this, of course, gives the exact dimension of the cavity.

The beam of any desired length is simply bent from round stock wire, the heads are cut from stock tubing, and the adjusting member is formed from rod material, as are the clamping plugs. When the heads and adjusting member are located on the wires and clamped in position the whole structure is very rigid so that accurate calipering may be accomplished.

The invention claimed is:—

1. A caliper comprising a beam formed of a single length of wire bent to U shape, a head with a calipering pin and transverse openings fitted upon and secured to the free ends of the two wires of the beam, a head with a calipering pin and transverse openings fitted upon and slidable along the two wires of the beam, separable means in the head for clamping said latter head to the beam wires, an adjusting member with transverse openings fitted and slidable along the beam wires, means for clamping the adjusting member to the beam wires, a thumb nut carried by the adjusting member, and a feed screw extending from the slidable head through the adjusting member and nut.

2. A caliper comprising a beam formed of a single length of wire bent to U shape, a pair of tubular calipering pin heads with transverse openings fitting the two wires of the beam, plugs in said heads between the beam wires, means for forcing said plugs against the beam wires and clamping the heads in position, an adjusting member slidable along the beam wires, means for clamping the adjusting member in position upon the beam wires, a thumb nut carried by the adjusting member, and a feed screw extending from one of said heads through the adjusting member and nut.

3. A caliper comprising a beam formed of a single length of wire bent to U shape, a pair of tubular calipering pin heads with transverse openings fitting the two wires of the beam, plugs with conical adjacent ends located in said heads between the beam wires, screws extending through the heads against the conical ends of the plugs for forcing the plugs outward against the beam wires, an adjusting member slidable along the beam wires, means for clamping the adjusting member in position upon the beam wires, a thumb nut carried by the adjusting member, and a feed screw extending from one of said heads through the adjusting member and nut.

4. A caliper comprising a beam formed of a single length of wire bent to U shape, a pair of tubular calipering pin heads connecting and slidable along the two wires of the beam, plugs in said heads between the beam wires, means carried by the heads for forcing the plugs against the beam wires, and means for adjusting one of said heads with relation to the other head along the beam wires.

5. A caliper comprising a beam formed of a single length of wire bent to U shape, tubular calipering pin heads connecting the two beam wires, means in the interior of the heads for clamping them to the beam wires, an adjusting member connecting the beam wires, means for clamping the adjusting member in position on the beam wires, and a feed screw and thumb nut connecting one of said heads to the adjusting member.

6. A caliper comprising a beam formed of a single length of wire bent to U shape, a pair of calipering pin heads provided with perforations adapted to receive the two wires of the beam, means carried by the heads and engaging the wires for clamping the heads in the positions to which they are adjusted, and an adjusting member provided with perforations adapted to receive the beam wires, means carried by the adjusting member and engaging one limb of the beam for clamping the adjusting member in position, a thumb nut carried by the adjusting member and a feed screw attached to one head and extending from that head through the adjusting member and nut carried thereby.

JOHN D. MALLOY.